United States Patent
Jakl

(10) Patent No.: US 11,038,383 B2
(45) Date of Patent: Jun. 15, 2021

(54) METHOD AND APPARATUS FOR ACTIVE DEVICE RECOGNITION AND ELIMINATION OF CROSS-TALK BETWEEN MULTIPLE MAGNETIC RESONANCE CHARGERS

(71) Applicant: Motorola Solutions, Inc., Chicago, IL (US)

(72) Inventor: Daniel Jakl, Dacula, GA (US)

(73) Assignee: Motorola Solutions, Inc., Chicago, IL (US)

( * ) Notice: Subject to any disclaimer, the term of this patent is extended or adjusted under 35 U.S.C. 154(b) by 265 days.

(21) Appl. No.: 16/398,885

(22) Filed: Apr. 30, 2019

(65) Prior Publication Data

US 2020/0350789 A1  Nov. 5, 2020

(51) Int. Cl.
*H02J 50/80* (2016.01)
*H02J 50/10* (2016.01)
*H02J 7/02* (2016.01)
*H04B 5/00* (2006.01)
*H02J 7/00* (2006.01)
*H02J 50/40* (2016.01)

(52) U.S. Cl.
CPC ............ *H02J 50/80* (2016.02); *H02J 7/0021* (2013.01); *H02J 7/025* (2013.01); *H02J 7/027* (2013.01); *H02J 50/10* (2016.02); *H02J 50/40* (2016.02); *H04B 5/0037* (2013.01)

(58) Field of Classification Search
USPC ......................................................... 320/108
See application file for complete search history.

(56) References Cited

U.S. PATENT DOCUMENTS

| 9,312,728 | B2 | 4/2016 | Baarman et al. |
| 9,582,950 | B2 | 2/2017 | Shimizu et al. |
| 9,755,437 | B2 | 9/2017 | Kuusilinna et al. |
| 9,961,483 | B1 * | 5/2018 | Berchanskiy ........... H02J 50/40 |
| 2017/0033587 | A1 * | 2/2017 | Hong ...................... H02J 50/80 |
| 2017/0117738 | A1 | 4/2017 | Yeoh et al. |

* cited by examiner

*Primary Examiner* — Edward Tso
*Assistant Examiner* — Ahmed H Omar
(74) *Attorney, Agent, or Firm* — Baker Botts L.L.P.

(57) ABSTRACT

A method and apparatus for preventing cross-talk in systems employing one-to-many magnetic resonance power transfer are disclosed. A method may include powering down a magnetic resonance coil, receiving an identifier from a power receive unit located at a predetermined charging location using close-range wireless communication, powering up the coil, receiving information from the power receive unit using short-range wireless communication addressed with the identifier, transferring energy from the power transfer unit to the power receive unit using the coil, and displaying an indication of the status of the battery to a display communicatively coupled to the power transfer unit. The predetermined location may be among a plurality of locations for a plurality of power receive units in proximity to the power transfer unit and the information received from the power receive unit may be indicative of a status of a battery electrically coupled to the power receive unit.

20 Claims, 12 Drawing Sheets

METHOD AND APPARATUS FOR ACTIVE DEVICE RECOGNITION AND ELIMINATION OF CROSS-TALK BETWEEN MULTIPLE MAGNETIC RESONANCE CHARGERS

BACKGROUND OF THE INVENTION

Many portable devices for public safety or mission critical applications, such as body cameras, remote speaker microphones (RSMs), and two-way radios, use energy sources, such as batteries, to support portability. These energy sources may be internal to the device or external to the device, and removable or non-removable. Portable devices may include multiple components for public safety or mission critical applications that consume energy from the energy source. Accordingly, these devices, or the energy sources, may need to be charged to maintain portability.

Certain chargers for these devices may require a wired connection between the charger and device or an optical communication interface. However, wired connections may require components, such as cables wires, pins, and switches, that are cumbersome, difficult to extend for wireless communications, and are prone to failure and that reduce the ability for the portable device to operate in public safety or mission critical applications, such as hazardous environments. Moreover, optical communication interfaces may be complex, expensive to implement, and unmanageable for portable devices enclosed in a case, holster, or other accessory. Public safety or mission critical applications may require numerous portable devices to be charged at the same time. However, the use of multiple chargers in close proximity to one another may result in cross-talk between the portable devices associated with different adjacent chargers, which in turn may reduce or prohibit charging.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
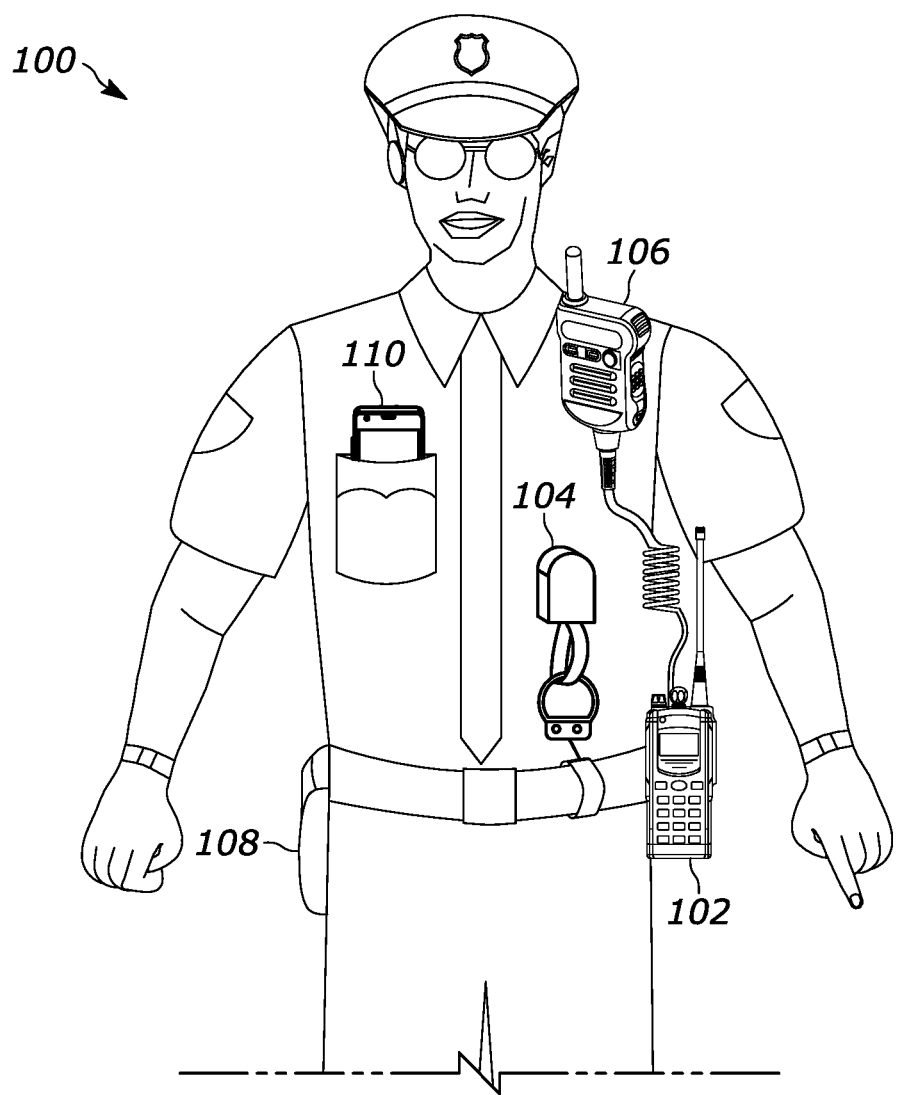
FIG. 1 is a system diagram illustrating a public safety user wearing multiple portable devices with power sources that are chargeable wirelessly, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The system, method, and apparatus components have been represented where appropriate by suitable symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed herein are systems, methods, and apparatuses for active device recognition and elimination of cross-talk between multiple magnetic resonance chargers.

In one embodiment, a disclosed method of preventing cross-talk in systems employing one-to-many magnetic resonance power transfer includes power down a magnetic resonance coil of a power transfer unit, receiving an identifier from a first power receive unit located in a first predetermined charging location using close-range wireless communication, powering up the magnetic resonance coil of the power transfer unit upon receipt of the identifier of the first power receive unit, receiving information from the first power receive unit using short-range wireless communication, transferring energy from the power transfer unit to the first power receive unit using the magnetic resonance coil, and displaying an indication of the status of the battery to a display communicatively coupled to the power transfer unit. The first predetermined charging location may be among a plurality of predetermined charging locations for a plurality of power receive units. The plurality of predetermined charging locations may be in proximity to the power transfer unit. The short-range wireless communication may be addressed to the first power receive unit with the identifier. The information may be indicative of a status of a battery electrically coupled to the first power receive unit.

In one embodiment, a disclosed magnetic resonance power transmitting unit may include a magnetic resonance coil and a magnetic resonance transmitting controller. The magnetic resonance transmitting controller may be coupled to a magnetic resonance power transmitter circuit, a close-range communication controller, a short-range communication controller, and a display. The magnetic resonance power transmitter circuit may be configured to power down the magnetic resonance coil. The close-range communication controller may be configured to receive an identifier from a first magnetic resonance power receiving unit located in a first predetermined charging location using close-range wireless communication. The first predetermined charging location may be among a plurality of predetermined charging locations for a plurality of magnetic resonance power receiving units and the plurality of predetermined charging locations may be in proximity to the magnetic resonance coil. The magnetic resonance power transmitter circuit may be configured to power up the magnetic resonance coil upon receipt of the identifier of the first magnetic resonance power receiving unit. The short-range communication controller may be configured to receive information from the first magnetic resonance power receiving unit using short-range wireless communication. The short-range wireless communication may be addressed to the first magnetic resonance power receiving unit with the identifier of the first magnetic resonance power receiving unit. The information may be indicative of a status of a battery electrically coupled to the first magnetic resonance power receiving unit. The magnetic resonance power transmitter circuit may be configured to control a transfer of energy to the first magnetic resonance power receiving unit using the magnetic resonance coil. The magnetic resonance power transmitter circuit may be configured to provide an indication of the status of the battery to the display.

In at least some embodiments of the present disclosure, the systems, methods, and apparatuses as described herein for preventing cross-talk in systems employing one-to-many magnetic resonance power transfer may receive a broadcast communication from a second power receive unit in proximity to the power transfer unit using short-range wireless communication, power down the magnetic resonance coil of the power transfer unit upon receipt of the broadcast communication, check a second predetermined charging location to receive a second identifier using close-range wireless communication, determine whether the second power receive unit is located at the second predetermined charging location based on whether the second identifier was received from the second power receive unit, and check a third predetermined charging location to receive a third identifier using close-range wireless communication based on a determination that the second power receive unit is not located at one of the plurality of predetermined charging locations. Unlike systems, methods, and apparatuses that receive broadcasts, the systems, methods, and apparatuses as described herein may check additional predetermined charging locations for the second power receive unit and cease communication with the second power receive unit when it is not located at one of the predetermined charging locations.

In at least some embodiments of the present disclosure, the systems, methods, and apparatuses as described herein for preventing cross-talk in one-to-many magnetic resonance power transfer may power down the magnetic resonance coil based on a determination that for each of the plurality of power receive units, a battery associated with the power receive unit in proximity to the power transfer unit and located at one of the plurality of predetermined charging locations is fully charged. Unlike systems, methods, and apparatuses that support magnetic resonance, the systems, methods, and apparatuses as described herein may power down the magnetic resonance coil and may support short-range wireless communication to update the display for each power receive unit with an indication of the amount of charge of the battery.

In at least some embodiments of the present disclosure, the systems, methods, and apparatuses as described herein for preventing cross-talk in one-to-many magnetic resonance power transfer may store the identifier and an indication of the first predetermined charging location upon receipt of the identifier from the first power receive unit. Unlike systems, methods, and apparatuses that support magnetic resonance charging, the systems, methods, and apparatuses described herein may store an identifier received using close-range wireless communication that is stored and used to address the power receive unit using short-range wireless communication.

In at least some embodiments of the present disclosure, the systems, methods, and apparatuses as described herein for preventing cross-talk in one-to-many magnetic resonance power transfer may support a first power receive unit that contains an antenna for the close-range wireless communication and a magnetic resonance coil for receiving the transferred energy located on the same plane. Unlike systems, methods, and apparatuses that support magnetic resonance charging, the systems, methods, and apparatuses described herein may co-locate the close-range wireless communication antenna and the magnetic resonance coil on the same plane.

Referring now to FIG. 1, there is provided a system diagram illustrating a public safety user wearing multiple portable devices with power sources that are chargeable wirelessly. Portable system 100 may include portable two-way radio 102 for one or more types of communication, including but not limited to standing wave radio transmission, land mobile radio (LMR) transmission, and long-term evolution (LTE) transmission. In various embodiments, two-way radio 102 may be coupled to one or more portable devices via a wireless or wired interface. For example, two-way radio 102 may be coupled to a remote speaker microphone (RSM), such as RSM 106. RSM 106 may be wired to two-way radio 102 or may be wirelessly coupled to two-way radio 102 via a short-range wireless communication protocol, such as Bluetooth or Wi-Fi. RSM 106 may be implemented in any suitable form including, but not limited to a remote or earpiece. In some embodiments, RSM 106 may include a body camera, which may record video and audio and playback the recorded video on a display or recorded audio on a speaker. In various embodiments, portable system 100 may include one or more environmental sensors for mission critical applications, such as gas sensor 104. In various embodiments, portable system 100 may include one or more detection sensors, such as a gun holster sensor 108. Gun holster sensor 108 may detect whether a gun is removed from the holster. Upon removal of the gun, gun holster sensor 108 may notify public safety users in the vicinity and public safety dispatch centers of the detection event. In some embodiments, gun holster sensor 108 may communicate with one or more other devices in portable system 100, such as a body camera integrated with RSM 106, which in turn may activate public safety video or audio recording. In various embodiments, portable system 100 may include mission critical handheld device 110 to deliver communications and data over long term evolution (LTE) networks, such as a public safety LTE network. Skilled artisans will appreciate that any number of portable devices may be used in portable system 100. For example, portable system 100 may include a handcuff holster sensor (not shown) to detect when handcuffs are removed and communicate with other portable devices, such as a body camera to record video or audio. Portable devices (102, 104, 106, 108 and 110) may include a power source, such as a non-removable battery, removeable battery, or external battery, to facilitate portability. After a period of use, portable devices (102, 104, 106, 108 and 110) may require charging to maintain portability.

Figure 2:
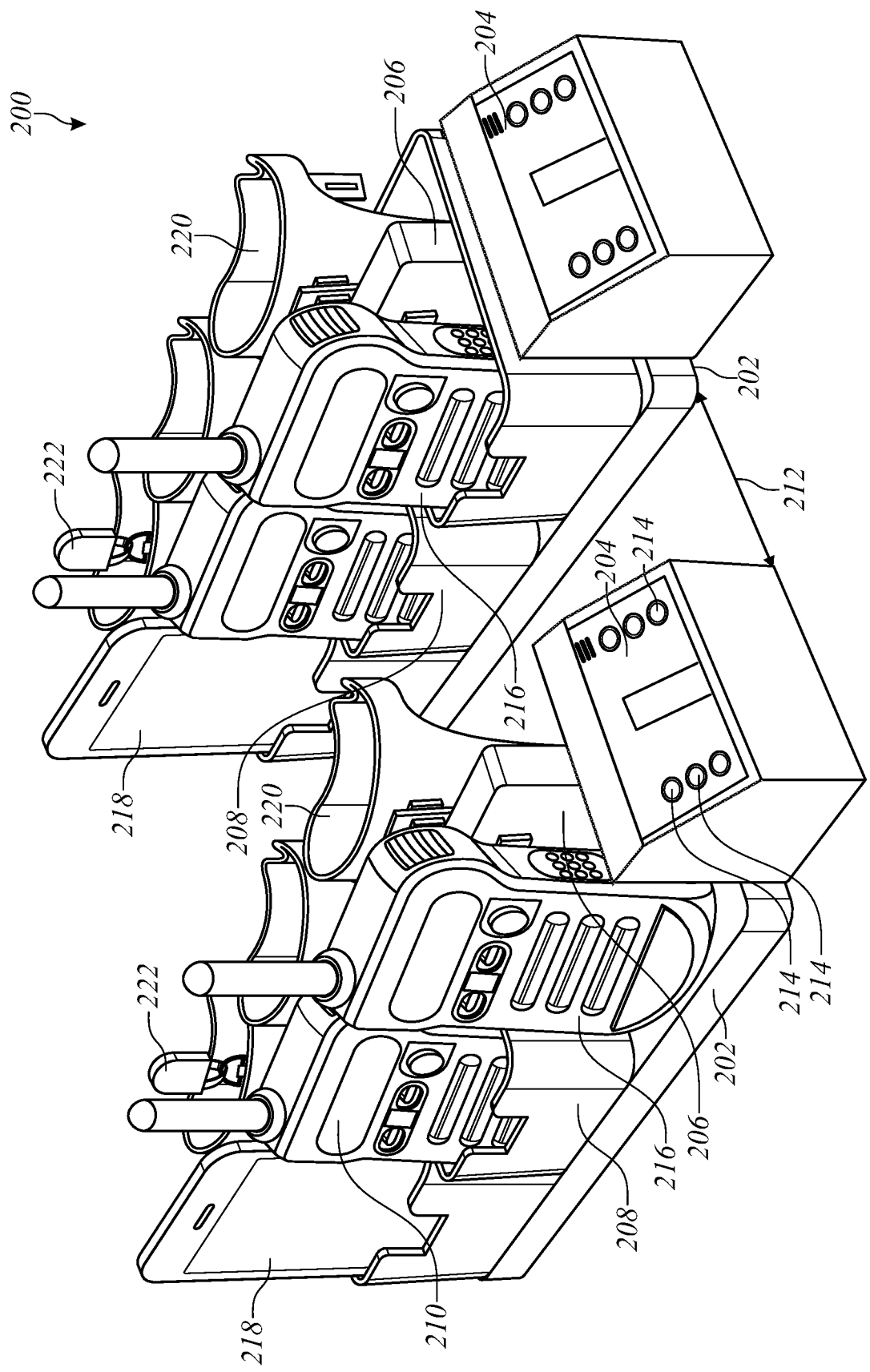
FIG. 2 is a system diagram illustrating multiple magnetic resonance chargers in proximity to each other with a plurality of portable devices, in accordance with some embodiments.

Referring now to FIG. 2, there is provided a system diagram illustrating multiple magnetic resonance chargers in proximity to each other with a plurality of portable devices. Wireless charging system 200 may include a plurality of magnetic resonance chargers 202. In various embodiments, magnetic resonance chargers 202 may be powered on and off simultaneously from the same power switch or surge protector. Each of the magnetic resonance chargers 202 may include a plurality of predetermined charging locations 208, also referred to as pockets. In some embodiments, one or more predetermined charging locations may include a slot to hold the portable devices (210, 216, 218, 220, 222). Each of the predetermined charging locations 208 may charge one of the portable devices (210, 216, 218, 220, 222). For example, each of the magnetic resonance chargers 202 may each include six predetermined charging locations to charge six of the portable devices (210, 216, 218, 220, 222). Portable device 210 may be implemented as a portable two-way radio, such as portable two-way radio 102 as described for FIG. 1. Portable device 216 may be implemented as a remote speaker microphone (RSM), such as RSM 106 as described for FIG. 1. Portable device 218 may be implemented as a mission critical handheld device, such as mission critical handheld device 110 as described for FIG. 1. Portable device 220 may be implemented as a gun holster sensor, such as gun holster sensor 108 as described for FIG. 1. Portable device 220 may be implemented as an environmental sensor, such as gas sensor 104 as described for FIG. 1. When the power switch or surge protector is turned on, each of the magnetic resonance chargers 202 may power up and identify each of the portable devices (210, 216, 218, 220, 222) that are located in one of the predetermined charging locations 208.

In various embodiments, magnetic resonance chargers 202 may include displays 204. Each of the displays 204 may include one or more light-emitting diodes (LEDs) 214. For example, one LED 214 may be used for each predetermined charging location to indicate the charging status of a portable device to a user. LEDs 214 may emit a particular color to indicate whether the pocket is empty or when the pocket is not empty, whether a portable device is charging, or whether the portable device is fully charged. Skilled artisans will appreciate that although two magnetic resonance chargers 202 are shown each having six predetermined charging locations 208 and a display 204 with six LEDs 214, any plurality of magnetic resonance chargers 202 may be used in wireless charging system 200 with any plurality of predetermined charging locations 208 per magnetic resonance charger and any number of displays 204 per magnetic resonance charger having any number of LEDs 214. Each of the plurality of predetermined charging locations 208 may charge one of the portable devices (210, 216, 218, 220, 222) located in that location.

Magnetic resonance chargers 202 may be placed in proximity to each other. For example, distance 212 may separate magnetic resonance chargers 202. In various embodiments, short-range wireless communications may be transferred over distance 212. For example, short-range wireless communications from portable devices (210, 216, 218, 220, 222) in pockets 208 of one of magnetic resonance chargers 202 may be transferred over distance 212 to another one of magnetic resonance chargers 202. Cross-talk between portable devices (210, 216, 218, 220, 222) in one of magnetic resonance chargers 202 and another one of magnetic resonance chargers 202 may inhibit magnetic resonance charging.

Magnetic resonance chargers 202 may wirelessly charge a plurality of portable devices (210, 216, 218, 220, 222) using magnetic resonance coils 206. Magnetic resonance coils 206 may power on after one or more portable devices (210, 216, 218, 220, 222) are identified. Magnetic resonance chargers 202 may identify one of the portable devices (210, 216, 218, 220, 222) in one of the predetermined charging locations 208 using close-range wireless communication to check each pocket. Each of the portable devices (210, 216, 218, 220, 222) present in a pocket may respond by sending an identifier using close-range wireless communication. Close-range wireless communication may prevent one of the portable devices (210, 216, 218, 220, 222) in another one of the predetermined charging locations 208 of the same magnetic resonance charger or of another magnetic resonance charger (202) from responding to the request to check a pocket. In various embodiments, each of the portable devices (210, 216, 218, 220, 222) may implement support for close-range wireless communication on the same plane as a magnetic resonance coil to ensure that the correct portable device responds to a check for a pocket. Skilled artisans will appreciate that although some examples of portable devices (210, 216, 218, 220, 222) are shown, each of the predetermined charging locations 208 of magnetic resonance chargers 202 may wirelessly charge any suitable portable device for public safety applications including, but not limited to, radios, remote or earpiece RSMs, body cameras, gas sensors, mission critical handheld devices, gun holster sensors, handcuff holster sensors, and batteries.

Figure 3A:
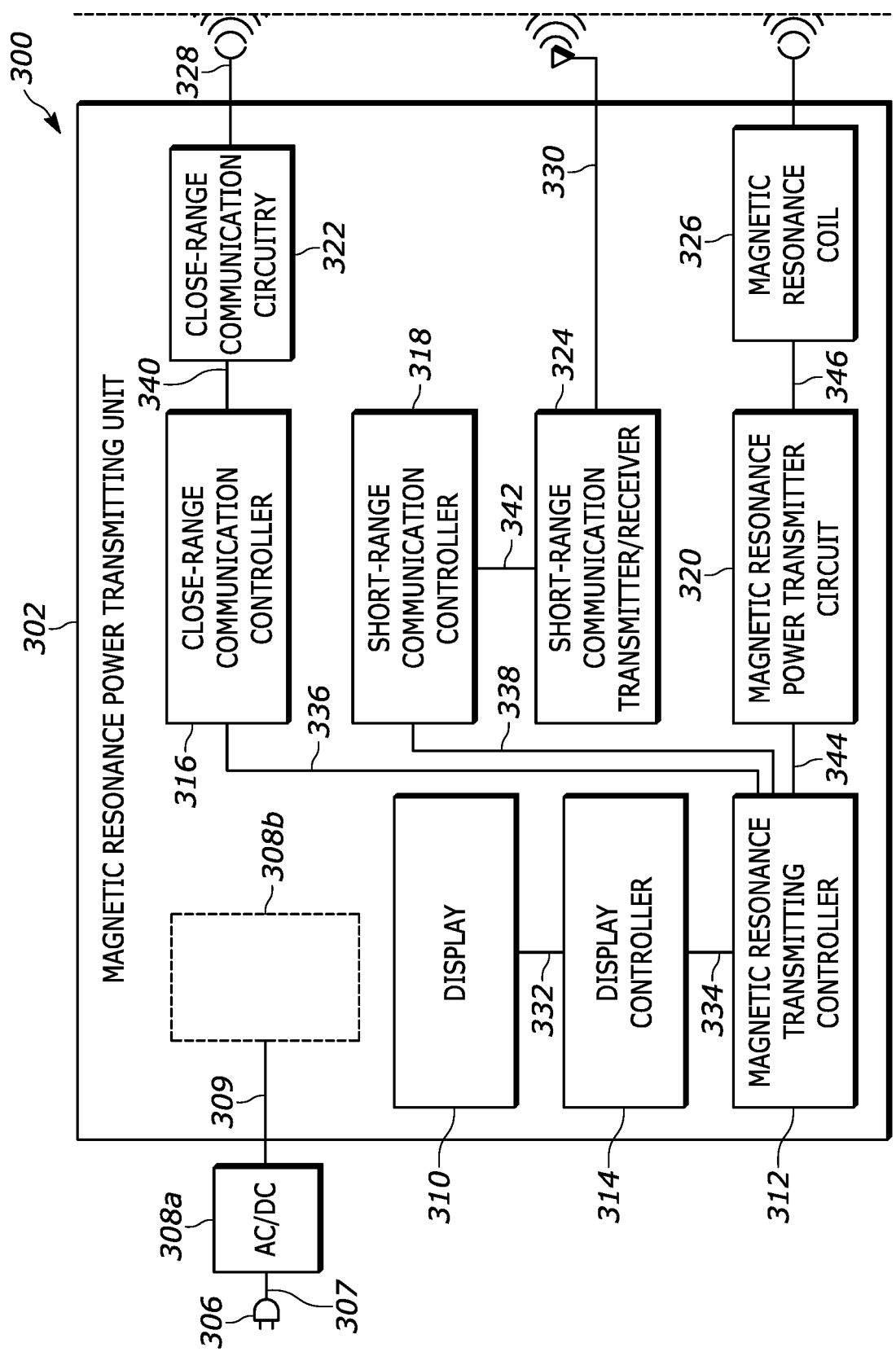
FIG. 3A is a block diagram illustrating a magnetic resonance power transmitting unit of an example magnetic resonance power charging system, in accordance with some embodiments.
Figure 3B:
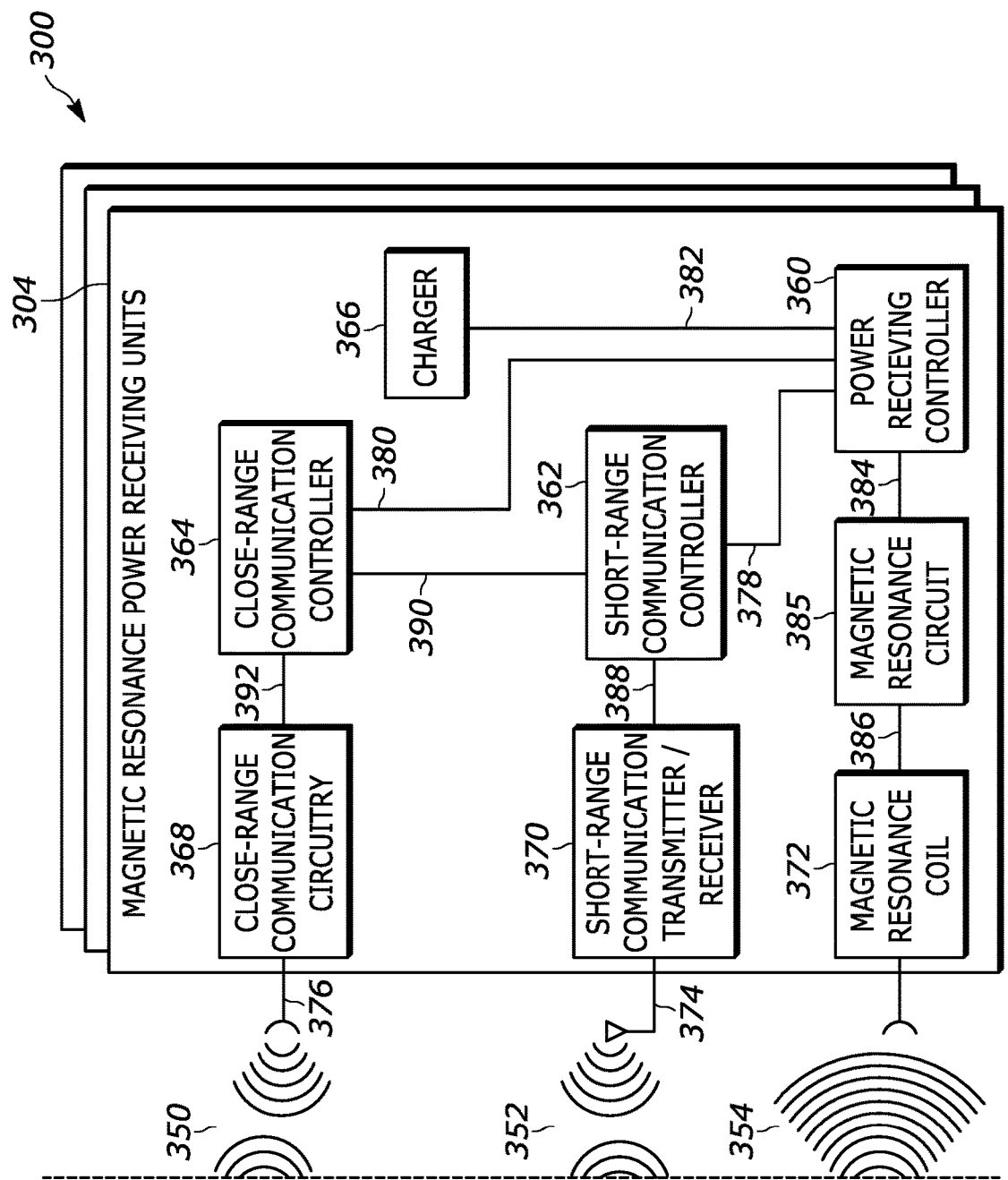
FIG. 3B is a block diagram illustrating magnetic resonance power receiving units of an example magnetic resonance power charging system, in accordance with some embodiments.

Referring now to FIGS. 3A and 3B, there is provided a block diagram illustrating an example magnetic resonance power transmitting unit 302 and example magnetic resonance power receiving units 304 of magnetic resonance power charging system 300. Magnetic resonance power charging system 300 may include magnetic resonance power transmitting unit 302, which may be referred to as a power transfer unit, and a plurality of magnetic resonance power receiving units 304, which may be referred to as power receive units. In various embodiments, magnetic resonance power transmitting unit 302 may receive DC power to supply power to components within magnetic resonance power transmitting unit 302 from AC-to-DC converter 308a, which may receive AC power via power cord 307 from AC plug 306. In some embodiments, magnetic resonance power transmitting unit 302 may integrate conversion from AC to DC power with internal AC-to-DC converter 308b that may receive AC power from AC plug 306 over power cord 307.

Magnetic resonance power transmitting unit 302 may transfer energy wirelessly to a plurality of magnetic resonance power receiving units 304. Magnetic resonance power receiving units 304 may be included in portable devices located at a plurality of predetermined charging locations associated with magnetic resonance power transmitting unit 302. In various embodiments, magnetic resonance power transmitting unit 302 may include magnetic resonance transmitting controller 312. Magnetic resonance transmitting controller 312 may interface with one or more controllers, such as display controller 314, close-range communication controller 316, and short-range communication controller 318.

For example, magnetic resonance transmitting controller 312 may communicate with short-range communication controller 318 via interface 338 to control transmitting and receiving information about magnetic resonance charging using a short-range communication protocol. Magnetic resonance transmitting controller 312 may control transmitting any suitable information to one of the magnetic resonance power receiving units 304 using short-range communication wireless including, but not limited to, acknowledgements to communicate with one of the magnetic resonance power receiving units 304 and information about the magnetic resonance charging capabilities of the magnetic resonance power transmitting unit 302, such as information defined by the A4WP wireless charging interface. Magnetic resonance transmitting controller 312 may control receiving any suitable information from a portable device using short-range wireless communication including, but not limited to, a short-range address, charging usage data, an indication whether the power source was reconditioned, when the power source was reconditioned, an indication whether the power source should be reconditioned, power source name, power source type, serial number of the power source or portable device, state of charge for one or more power sources, amount of charge for one or more power sources, rated capacity for one or more power sources, initial capacity for one or more power sources, number of charge cycles for one or more power sources, number of reconditioning cycles for one or more power sources, and age of one or more power sources. In various embodiments, magnetic resonance transmitting controller 312 may control short-range communication controller 318 via interface 338 and short-range communication controller 318 may control short-range communication transmitter/receiver 324 via interface 342. Short-range transmitter/receiver 324 may communicate via short-range wireless interface 352 with one or more magnetic resonance power receiving units 304 using antenna 330. For example, the short-range wireless communication may use the Bluetooth protocol. Short-range wireless communication via short-range wireless interface 352 may be received by one or more magnetic resonance power receiving units 304. In various embodiments, short-range communication antenna 374 of one of the magnetic resonance power receiving units 304 may receive communication via short-range wireless interface 352. Short-range communication transmitter/receiver 370 may be coupled to short-range communication antenna 374 and short-range communication controller 362 via interface 388. Short-range communication controller 362 may be coupled to close-range communication controller 364 via interface 390 and power receiving controller 360 via interface 378 to control transmission of information about the magnetic resonance power receiving unit and receipt of information about the magnetic resonance power transmitting unit. In some embodiments, short-range wireless communication may be encrypted to prevent snooping by other nearby devices. For example, the serial number and charging usage data provided by magnetic resonance power receiving units 304 may be encrypted.

As another example, magnetic resonance transmitting controller 312 may communicate with close-range communication controller 316 via interface 336 to control identification of magnetic resonance power receiving units 304 at predetermined charging locations. Magnetic resonance transmitting controller 312 may control reading an identifier associated with one of the magnetic resonance power receiving units 304 using close-range wireless communication. In various embodiments, magnetic resonance transmitting controller 312 may control close-range communication controller 316 via interface 336. Close-range communication controller 316 may control close-range communication circuitry 322 via interface 340. Close-range communication circuitry 322 may wirelessly communicate with one or more magnetic resonance power receiving units 304 via close-range wireless interface 350 using close-range communication antenna 328. For example, close-range communication antenna 328 may be implemented as a coil. In some embodiment, close-range wireless communication via close-range communication wireless interface 350 may use the Near Field Communication (NFC) protocol. Close-range wireless communication via close-range communication wireless interface 350 may be received by one or more magnetic resonance power receiving units 304. In various embodiments, close-range communication antenna 376 of one of the magnetic resonance power receiving units 304 may receive communications via close-range communication wireless interface 350. Close-range communication circuitry 368 may be coupled to close-range communication antenna 376 and close-range communication controller 364 via interface 392. Close-range communication controller 364 may be coupled to short-range communication controller 362 via interface 390 and to power receiving controller 360 via interface 380 to control receiving of requests to identify the magnetic resonance power receiving unit and transmitting of identifiers associated with the magnetic resonance power receiving unit. For example, a tag embedded in a portable device, such as close-range communication circuitry 368 or close-range communication antenna 376, may be read using close-range wireless communication. The tag may provide an identifier associated with the magnetic resonance power receiving unit of the portable device, such as the short-range wireless communication address associated with the portable device. Close-range communication controller 316 may receive the identifier from one of the magnetic resonance power receiving units 304 via close-range communication interface 350, close-range communication antenna 328, close-range communication circuitry 322, and interface 340. Close-range communication controller 316 may return the identifier to magnetic resonance transmitting controller 312, which may store a list of short-range wireless communication identifiers and the corresponding predetermined charging location, such as an indication of which predetermined charging location is associated with the received identifier. Magnetic resonance transmitting controller 312 may track whether a predetermined charging location is populated with a portable device with wireless charging capability and whether the portable device is the same or different device as previously identified using close-range wireless communication.

As a further example, magnetic resonance transmitting controller 312 may communicate with display controller 314 via interface 334 to provide information to be shown on display 310 via interface 332. Skilled artisans will appreciate that information may be provided to a display integrated within magnetic resonance power transmitting unit 302 or external to magnetic resonance power transmitting unit 302, such as a display for a personal computer or an automobile infotainment. Display 310 may be implemented in any suitable form including, but not limited to, a liquid-crystal display (LCD), organic light-emitting diode (OLED) display, and one or more light emitting diodes (LEDs). For example, display 310 may include an LCD that shows the amount of charge for one or more power sources coupled to each of the magnetic resonance power receiving units 304. Skilled artisans will appreciate that magnetic resonance transmitting controller 312 may directly or indirectly interface with display controller 314, close-range communication controller 316, and short-range communication controller 318. For example, magnetic resonance transmitting controller 312 may directly interface with short-range communication controller 318 and indirectly interface with display controller 314 and close-range communication controller 316 via short-range communication controller 318.

Magnetic resonance transmitting controller 314 may be coupled to magnetic resonance power transmitter circuit 320 via interface 344. Magnetic resonance power transmitter circuit may provide a variety of power transfer capabilities including, but not limited to, amplification, filtering, and tuning for magnetic resonance power transfer. Magnetic resonance coil 326 may be coupled to magnetic resonance power transmitter circuit 320 via interface 346. In various embodiments, magnetic resonance coil 326 in magnetic resonance power transmitting unit 302 may transmit power wirelessly 354 to magnetic resonance coil 372 in one of the magnetic resonance power receiving units 304. Magnetic resonance coil 372 may be coupled to magnetic resonance circuit 385 via interface 386 to convert the energy received into a DC voltage or current. Power receiving controller 360 may control the conversion by magnetic resonance circuit 385 via interface 384. In various embodiments power receiving controller 360 may provide the converted DC voltage or current to charger 366 via interface 382 to charge a power source, such as a battery (not shown).

Skilled artisans will appreciate that various controllers and circuitry in magnetic resonance power charging system 300 may be implemented as discrete components and circuitry or integrated into one or more components. For example, magnetic resonance transmitting controller 312, display controller 314, short-range communication controller 318, and close-range communication controller 316 may be integrated into the same integrated circuit. Discrete components and integrated components may be implemented in any suitable form including, but not limited to, integrated circuits (ICs), application-specific integrated circuits (ASICs), field-programmable gate arrays (FPGAs).

Figure 4A:
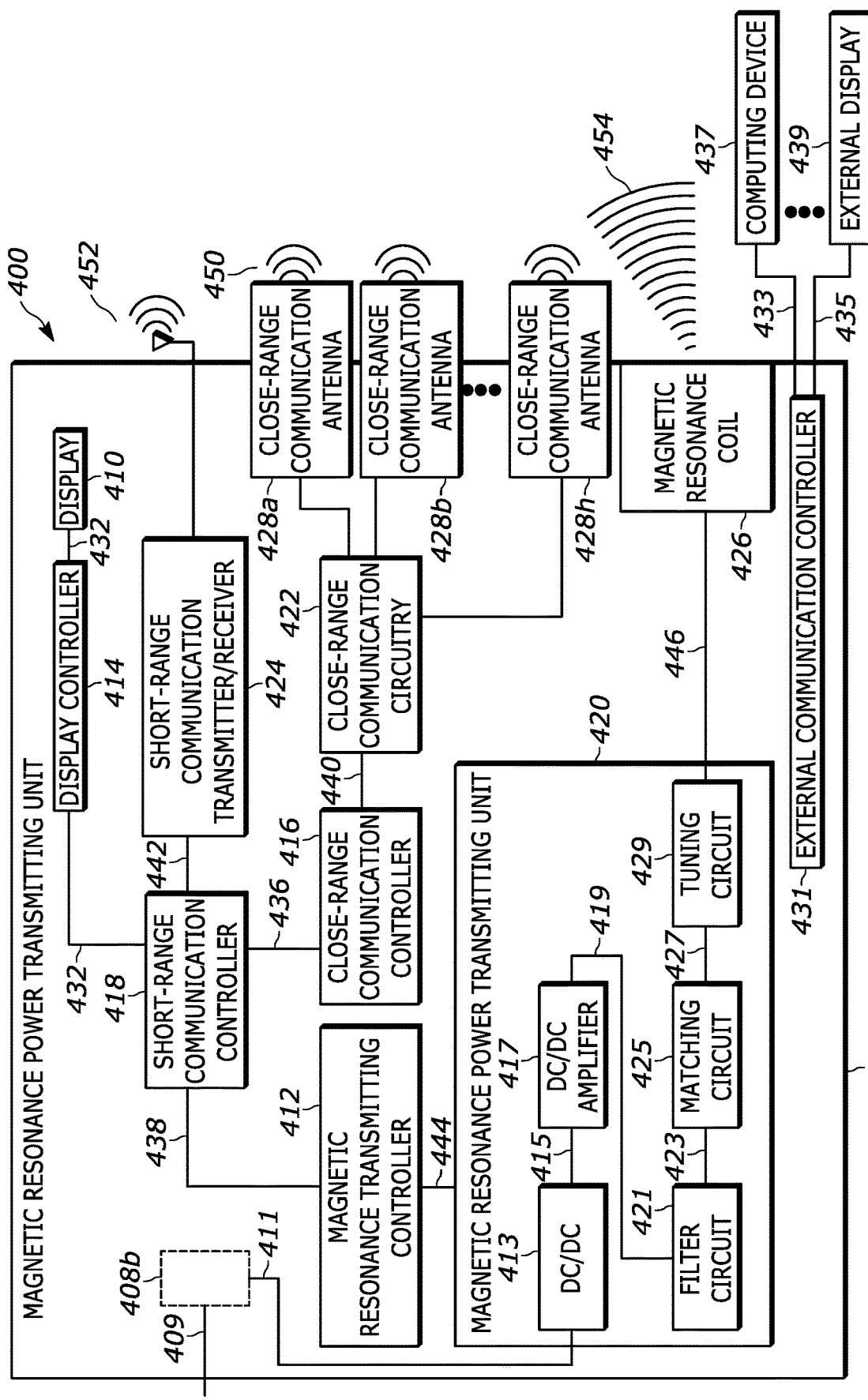
FIG. 4A is a block diagram illustrating an example magnetic resonance power transmitting unit wirelessly coupled to provide power to a plurality of magnetic resonance power receiving units, in accordance with some embodiments.
Figure 4B:
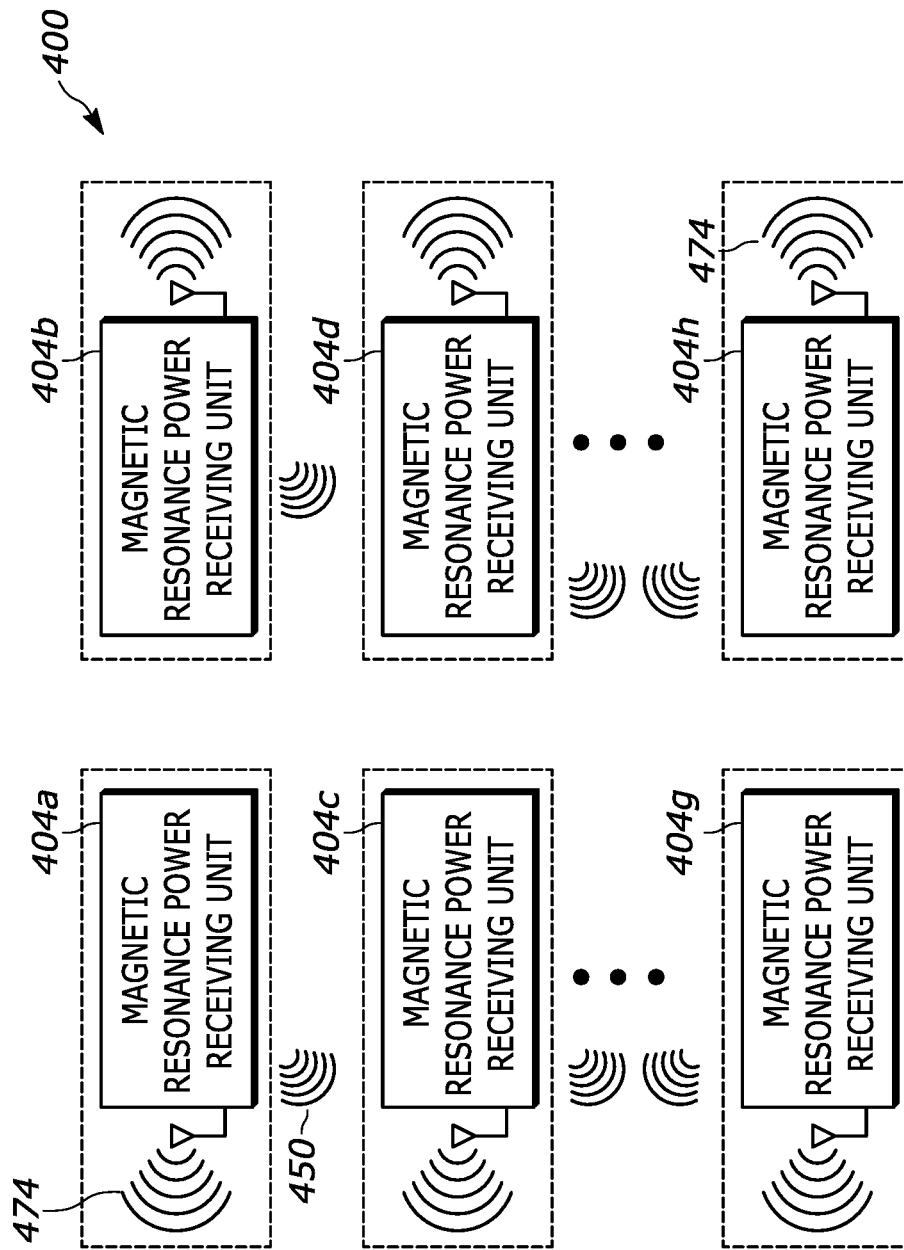
FIG. 4B is a block diagram illustrating an example plurality of magnetic resonance power receiving units wirelessly coupled to receive power from a magnetic resonance power transmitting unit, in accordance with some embodiments.

Referring now to FIGS. 4A and 4B, there is provided a block diagram illustrating an example magnetic resonance power transmitting unit 402 wirelessly coupled to provide power to a plurality of magnetic resonance power receiving units 404. Elements in magnetic resonance power charging system 400 in FIG. 4A may be similar to those in magnetic resonance power charging system 300 in FIG. 3 and may be designated with similar identifications. For example, magnetic resonance power transmitting unit 402 in FIG. 4A may be similar to magnetic resonance power transmitting unit 302 in FIG. 3A.

In various embodiments, magnetic resonance power transmitting unit 402 may receive AC power or DC power via power cord 409. After power is received, the power may be converted from AC to DC by converter 408b. DC-to-DC converter 413 of magnetic resonance power transmitter circuit 420 may receive a DC voltage via interface 411. DC-to-DC converter 413 may convert an input DC voltage to a higher or lower DC voltage that is provided via interface 415 to DC-to-AC amplifier 417. In various embodiments, DC-to-AC amplifier 417 may convert and amplify a DC voltage to an AC signal as required by magnetic resonance coil 426 for wireless charging. The AC signal received via interface 419 by filter circuit 421. Filter circuit 421 may apply one or more filters to the signal, such as a bandpass filter around the 6.78 MHz frequency band. The filtered AC signal may be received via interface 423 by matching circuit 425. Matching circuit 425 may adjust the input signal based on the impedance of magnetic resonance coil 426. For example, matching circuit 425 may adjust the frequency of the input signal. The matched and filtered AC signal may be received via interface 427 by tuning circuit 429. Tuning circuit 429 may adjust the input signal based on an equivalent circuit model or system parameters, including the system load. The resulting signal may be provided to magnetic resonance coil 426 via interface 446. Magnetic resonance coil 426 may then transfer energy wirelessly 454 to a plurality of magnetic resonance power receiving units 404 that may each include a magnetic resonance coil, such as magnetic resonance coil 372 as described for FIG. 3B, to receive transferred energy. Skilled artisans will appreciate that the efficiency of magnetic resonance power transmitting unit may be increased by reducing the number of AC-to-DC and DC-to-AC conversions between the AC power received via power chord 409 and the resulting AC signal for magnetic resonance coil 426 provided via interface 446. For example, the AC input may be adjusted for magnetic resonance coil 426 without converting the input to a DC signal.

Magnetic resonance power transmitter circuit 420 may be coupled via interface 444 to magnetic resonance transmitting controller 412, which may be coupled to close-range communication controller 416 over interface 438, short-range communication controller 418, and interface 436. Close-range communication circuitry 422 may be coupled to close-range communication controller 416 via interface 440 and to a plurality of close-range communication antennas (428a, 428b, . . . , 428h, etc.). Although three close-range communication antennas 428 are shown, magnetic resonance power transmitting unit 402 may include any plurality of close-range communication antennas 428. For example, magnetic resonance power transmitting unit 402 may include a close-range communication antenna 428 for close-range wireless interface 450 to each predetermined charging location. Each predetermined charging location may accommodate a portable device with a magnetic resonance power receiving unit (404a, 404b, 404c, 404d, . . . , 404g, 404h, etc.). Magnetic resonance power receiving units 404 may communicate over close-range wireless interface 450 using close-range communication antennas (not shown) and over short-range wireless interface 452 via short-range communication antennas 474. For example, magnetic resonance charging system 400 may include magnetic resonance power transmitting unit 402 with eight close-range communication antennas 428 and eight predetermined charging locations to support a maximum of eight magnetic resonance power receiving units 404. Skilled artisans will appreciate that any plurality of close-range communication antennas 428, predetermined charging locations, and magnetic resonance power receiving units 404 may be implemented in magnetic resonance charging system 400.

In various embodiments, magnetic resonance power transmitting unit 402 may include external communication controller 431 to provide information to one or more external devices, such as computing device 437 via interface 433 and external display 439 via interface 435. External communication controller 431 may be coupled to magnetic resonance transmitting controller 412 (not shown) to receive information about magnetic resonance charging system 400. The information provided by external communication controller 431 may include, but is not limited to, information about the amount of charge for the battery in each portable device located at one of the predetermined charging locations for magnetic resonance power charging system 400.

Referring now to FIG. 4B, there is provided a top view of a block diagram illustrating select elements of magnetic resonance power charging system 400. Magnetic resonance power transmitting unit 404 may include magnetic resonance coil 426. In some embodiments, magnetic resonance coil 426 may be arranged in a fin shape extending vertically from the base of magnetic resonance power transmitting unit 404, such as magnetic resonance coil 206 described for FIG. 2. Magnetic resonance coil 426 may be located between one or more predetermined charging locations to transmit power wirelessly 354 to a plurality of magnetic resonance power receiving units 404. Skilled artisans will appreciate that any plurality of predetermined charging locations and magnetic resonance power receiving units 404 may be implemented in magnetic resonance charging system 400.

Figure 5:
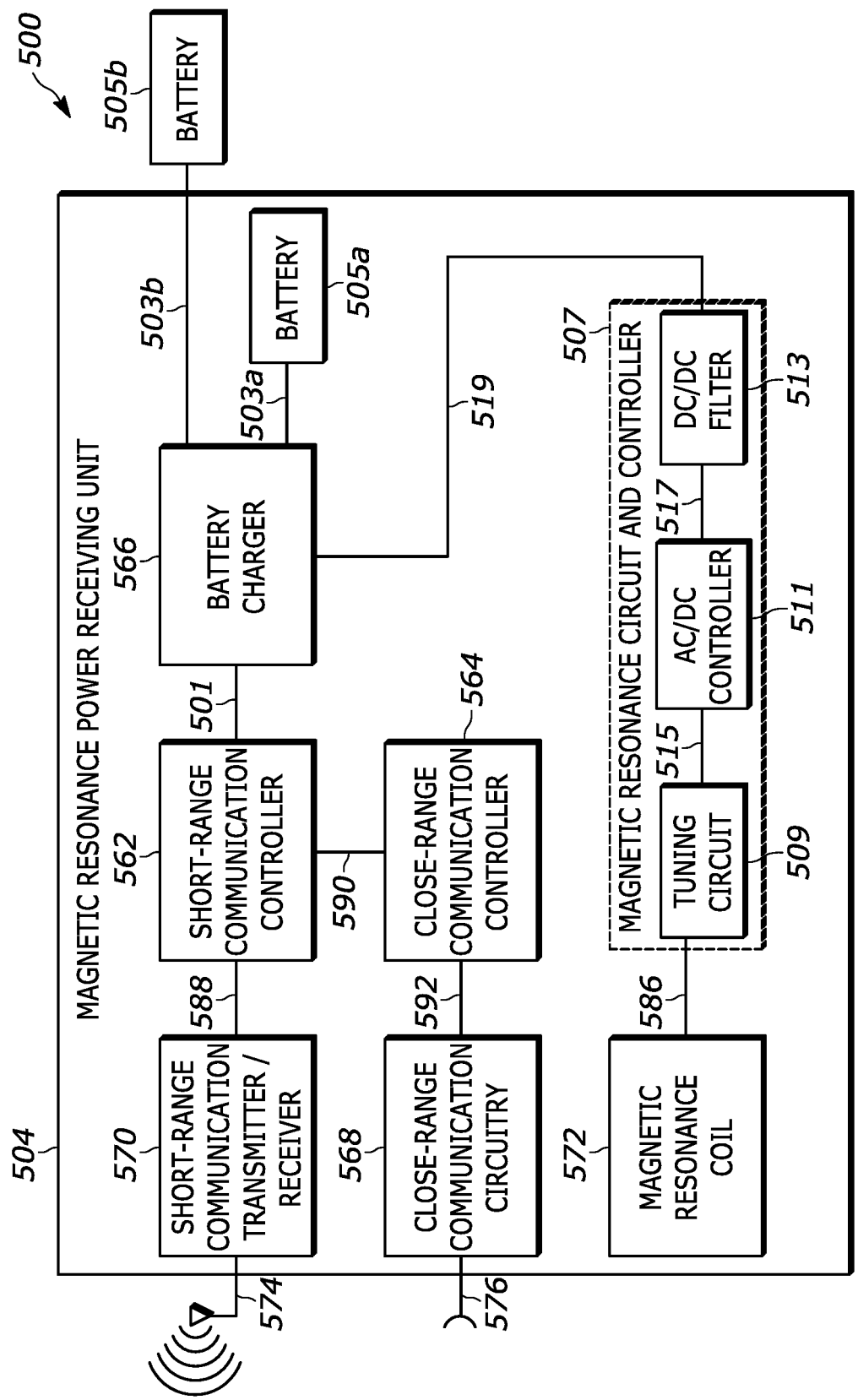
FIG. 5 is a block diagram illustrating an example magnetic resonance power receiving unit, in accordance with some embodiments.

Referring now to FIG. 5, there is provided a block diagram illustrating an example magnetic resonance power receiving unit 504 in magnetic resonance power charging system 500. Elements in magnetic resonance power charging system 500 in FIG. 5 may be similar to those in magnetic resonance power charging system 300 in FIG. 3 and may be designated with similar identifications. For example, short-range communication transmitter/receiver 370 in FIG. 3B may be similar to short-range communication transmitter/receiver 570 in FIG. 5. Magnetic resonance power receiving unit 504 may be coupled to receive short-range wireless communication via short-range communication antenna 574, close-range wireless communication via close-range communication antenna 576, and wireless power via magnetic resonance coil 572.

In various embodiments, magnetic resonance coil 572 may be coupled to magnetic resonance circuit and controller 507 via interface 586. Magnetic resonance circuit and controller 507 may be similar to magnetic resonance circuit 385 and power receiving controller 360 as described for FIG. 3B. Tuning circuit 509 in magnetic resonance circuit and controller 507 may receive energy from magnetic resonance coil 572 and adjust the energy based on an equivalent circuit model or system parameters, including the system load. The resulting signal may be provided to AC/DC controller 511 via interface 515. AC/DC controller 511 may convert an AC signal to a DC signal. For example, AC/DC controller 511 may be an application specific integrated circuit (ASIC). AC/DC controller 511 may receive an AC power signal via interface 515 and provide a rectified output signal, which may be used with DC to DC converter. In various embodiments, the DC signal output from AC/DC controller 511 may be provided over interface 517 to DC/DC filter 513, which may adjust the DC signal to provide a stable regulated DC signal, which may be used by battery charger 566. In some embodiments, magnetic resonance power receiving unit 504 may implement support for close-range wireless communication. For example, implementation of close-range communication antenna 576 may include locating the antenna on the same plane as magnetic resonance coil 572 to ensure that the correct magnetic resonance power receiving unit 504 responds to close-range wireless communication from a magnetic resonance power transmitting unit.

Battery charger 566 may be coupled to short-range communication controller 562 via interface 501 to receive an indication from a magnetic resonance power transmitting unit (not shown), such as whether the magnetic resonance power transmitting unit is transmitting energy to magnetic resonance power receiving unit 504. In various embodiments, battery charger 566 may be coupled to DC/DC filter 513 to receive a DC signal via interface 519. The DC signal may provide energy to battery charger 566 for charging a power source, such as internal battery 505a via interface 503a or external battery 505b via interface 503b. Skilled artisans will appreciate that although a battery is shown, other types of power sources may be charged. Moreover, any number of power sources that are internal or external to magnetic resonance power receiving unit 504 may be charged by battery charger 566.

Figure 6:
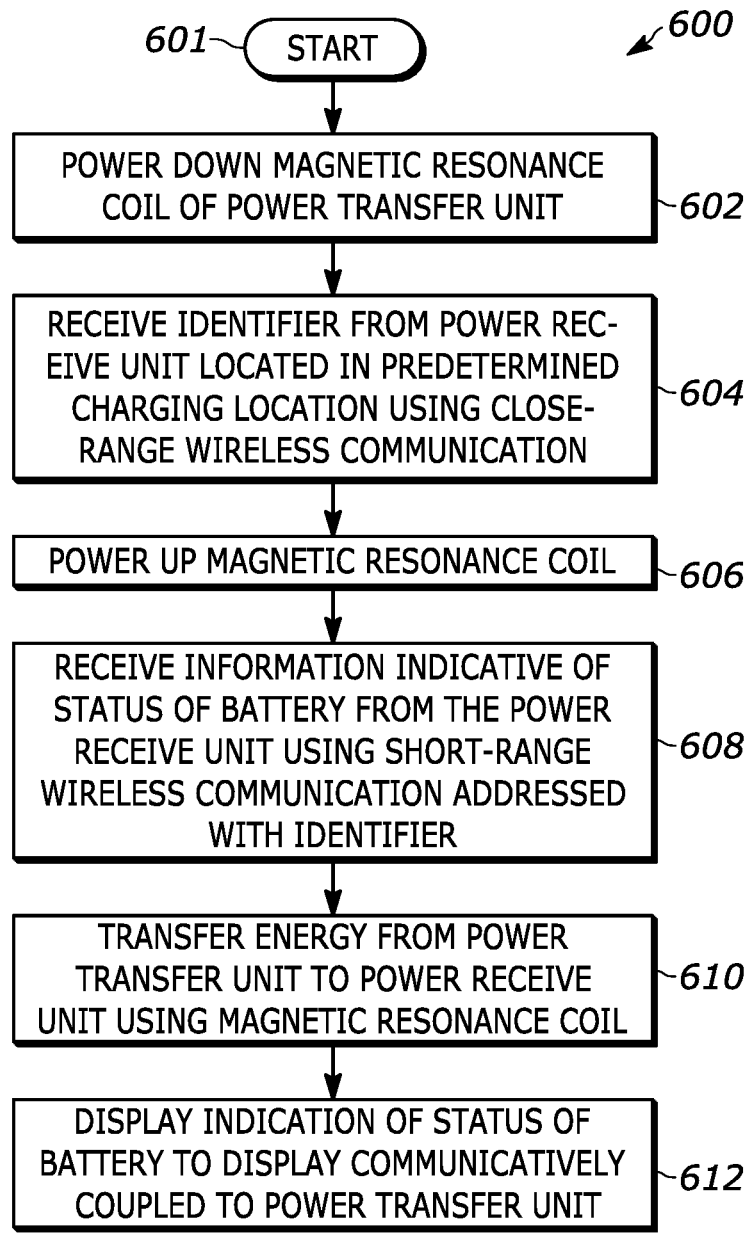
FIG. 6 is a flow diagram illustrating a method for preventing cross-talk in one-to-many magnetic resonance power transfer, in accordance with some embodiments.

Referring now to FIG. 6, there is provided a flowchart illustrating method 600 for preventing cross-talk in one-to-many magnetic resonance power transfer. While a particular order of operations is indicated in FIG. 6 for illustrative purposes, the timing and ordering of such operations may vary where appropriate without negating the purpose and advantages of the examples set forth in detail throughout the remainder of this disclosure. In some embodiments, one or more portions of method 600 may be executed at some predetermined periodic time period thereafter, in response to a timeout, a broadcast communication, or a power-up event. For example, an indication of battery status may be displayed before energy is transferred from the power transfer unit.

In this example embodiment, method 600 begins with block 601 in FIG. 6 and continue to block 602, where the magnetic resonance coil of the power transfer unit may be powered down. For example, magnetic resonance coil 326 of magnetic resonance power transmitting unit 302 may be powered down as described for FIG. 3A. Powering down the magnetic resonance coil of the power transfer unit may stop wireless power transfer to one or more magnetic resonance power receiving units, such as magnetic resonance power receiving units 304 as described for FIG. 3B. In various embodiments, powering down the magnetic resonance coil may reduce the power consumption including, but not limited to, reducing inductive losses and power consumed by circuitry coupled to the magnetic resonance coil, such as one or more portions of magnetic resonance power transmitter circuit 320 as described for FIG. 3A.

At block 604, an identifier may be received from a power receive unit using close-range wireless communication. The power receive unit may be located in a predetermined charging location, which may be among a plurality of predetermined charging locations for a plurality of power receive units in proximity to the magnetic resonance coil of the power transfer unit. For example, magnetic resonance power transmitting unit 302 as described for FIG. 3A may receive an identifier via close-range wireless communication 350 from one of the magnetic resonance power receiving units 304. As described for FIGS. 3A and 3B, the identifier may be provided to the magnetic resonance transmitting controller 312 for evaluation. In various embodiments, the close-range wireless communication may be provided in accordance with one or more protocols, such as a near-field communication (NFC) protocol. The received identifier of the power receive unit may indicate the address of the power receive unit to be used for short-range wireless communication. In various embodiments, the predetermined charging location may correspond to a pocket for wireless charging using the magnetic resonance coil of the power transfer unit.

At block 606, the magnetic resonance coil of the power transfer unit may be powered up. For example, magnetic resonance coil 326 of magnetic resonance power transmitting unit 302 may be powered up as described for FIGS. 3A and 3B. In some embodiments, the magnetic resonance coil may be powered down before close-range wireless communications and powered up after close-range wireless communications to reduce the likelihood of damage to antennas and circuitry for close-range wireless communications, which may operate at a harmonic frequency of the magnetic resonance coil.

At block 608, information may be received that is indicative of a status of a battery. The information may be received from the power receive unit using short-range wireless communication that is addressed using the identifier received from the power receive unit using close-range wireless communication. The battery may be electrically coupled to the power receive unit in any suitable configuration including, but not limited to, a battery electrically coupled internal to the power receive unit or a battery external to the power receive unit that is electrically coupled to the power receive unit via a wired interface. In various embodiments, the information may include one or more status indications about the battery including, but not limited to, charging usage data, an indication whether the battery was reconditioned, when battery was reconditioned, an indication whether the battery should be reconditioned, battery name, battery type, serial number of battery or portable device, state of charge for one or more batteries, amount of charge for one or more batteries, rated capacity for one or more power sources, initial capacity for one or more power sources, number of charge cycles for one or more power sources, number of reconditioning cycles for one or more power sources, and age of one or more batteries. Although a battery is described, skilled artisans will appreciate that other types of power sources may be used and that any suitable number of power sources may be used for a portable device.

At block 610, energy may be transferred from the power transfer unit to the power receive unit using the magnetic resonance coil. In various embodiments, the magnetic resonance coil may operate within a frequency band, such as the 6.78 MHz band. Energy may be transferred to a magnetic resonance coil in the power receive unit and converted into a form of energy to be used to charge the battery for the power receive unit. For example, energy may be received by magnetic resonance coil 572 as described for FIG. 5.

At block 612, an indication of the status of the battery may be displayed on a display that is communicatively coupled to the power transfer unit. The display may be integrated or external to the power transfer unit. For example, display 310 is integrated into magnetic resonance power transmitting unit 302 as described for FIG. 3A. As another example, external display 439 is external to magnetic resonance power transmitter unit 402 as described for FIG. 4A. The display may be any suitable medium, including one or more LCDs, OLEDs, or LEDs. For example, the display may include an LED that emits light in different colors to indicate the status of the battery. One color may indicate whether the battery is present in a predetermined charging location, another color or LED may indicate whether the battery is being charged, and another color or LED may indicate whether the battery is fully charged. As another example, the display may include an OLED that indicates the status of the battery by displaying that amount of charge for the battery.

Figure 7:
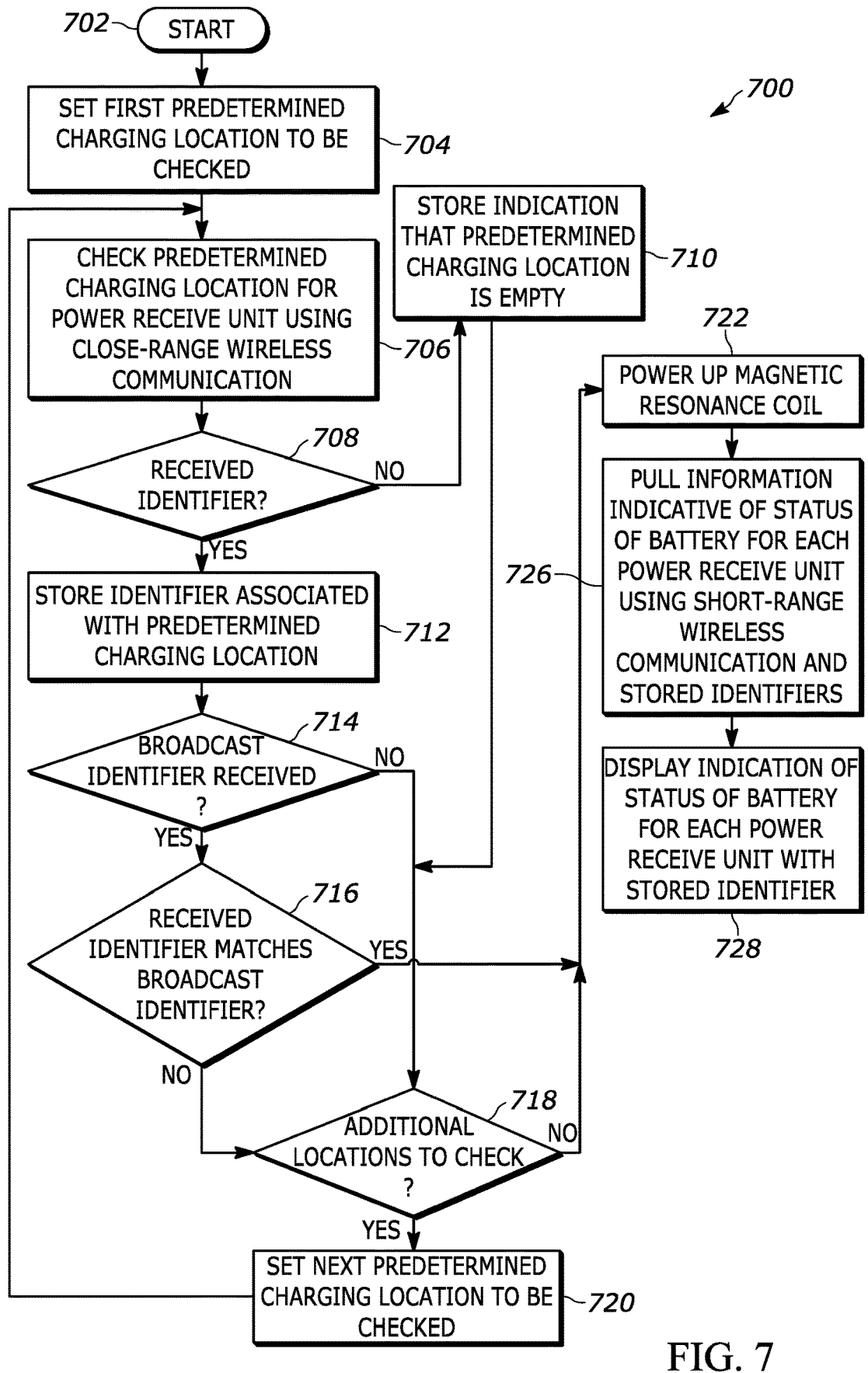
FIG. 7 is a flow diagram illustrating a method for power up and portable device detection for magnetic resonance power transfer, in accordance with some embodiments.

Referring now to FIG. 7, there is provided a flow diagram illustrating a method for power up and portable device detection for magnetic resonance power transfer. While a particular order of operations is indicated in FIG. 7 for illustrative purposes, the timing and ordering of such operations may vary where appropriate without negating the purpose and advantages of the examples set forth in detail throughout the remainder of this disclosure. In some embodiments, one or more portions of method 700 may be executed at some predetermined periodic time period thereafter, in response to a timeout, a broadcast communication, or a power-up event. For example, multiple predetermined charging locations may be checked for power receive units in parallel.

In this example embodiment, method 700 begins with block 702 in FIG. 7 and continue to block 704 where a first predetermined charging location to be checked may be set. When the magnetic resonance power transmitting unit, which may be referred to as the power transfer unit, is powered up, the first predetermined charging location may be the first location, which may not have a magnetic resonance power receiving unit, which may be referred to as a power receive unit. In some embodiments, when the magnetic resonance power transmitting unit is responding to a short-range wireless broadcast communication the first predetermined charging location to be checked may be set to the first location that does not have a power receive unit. The magnetic resonance power transmitting unit may store identifiers received from each power receive unit and an indication of which predetermined charging location is associated with the power receive unit.

At block 706, the predetermined charging location may be checked for a power receive unit using close-range wireless communication. In various embodiments, the close-range wireless communication may be provided in accordance with one or more protocols, such as an NFC protocol. The power receive unit may include a close-range communication antenna co-located with a magnetic resonance coil. In some embodiments, the close-range communication antenna may be placed on the same plane as the magnetic resonance coil and the close-range communication controller and a power receiving controller may be integrated on the same integrated circuit. For example, close-range communication antenna 376 as described for FIG. 3B may be placed on the same plane as magnetic resonance coil 372 and close-range communication controller 364 may be integrated on the same integrated circuit as power receiving controller 360. The close-range communication antenna and close-range communication controller may be isolated from the magnetic resonance coil and the power receiving controller to reduce interference. In various embodiments, the check for a power receive unit may include the close-range wireless controller of the power transfer unit polling the predetermined charging location that was set for a power receive unit and the close-range wireless controller of the power receive unit responding to the poll with a tag, such as an identifier to be used for short-range wireless communication with the power receive unit.

At block 708, it may be determined whether an identifier was received by the power transfer unit. The identifier may be sent by a power receive unit in response to a check for a power receive unit at the predetermined charging location. For example, the power transfer unit may poll the predetermined charging location using close-range wireless communication. The power receive unit may respond to the poll with an identifier using close-range wireless communication to the power transfer unit. When an identifier is not received, method 700 may proceed to block 710 where an indication that the predetermined charging location is empty may be stored. For example, magnetic resonance transmitting controller 312 as described for FIG. 3A may store the indication in any suitable structure, such as a list, table, or map. Method 700 may then proceed to block 718. When an identifier is received, method 700 may proceed to block 712 where the received identifier associated with the predetermined charging location may be stored with an indication of which predetermined charging location is associated with the power receive unit. For example, magnetic resonance transmitting controller 312 as described for FIG. 3A may store the identifier and the associated predetermined charging location.

At block 714, it may be determined whether a broadcast identifier was received, such as by a previous short-range broadcast communication. A short-range broadcast communication may indicate to the power transfer unit that a new power receive unit may be requesting wireless power delivery. When a broadcast identifier is received, method 700 may proceed to block 716 where it may be determined whether the identifier received using close-range wireless communication matches the broadcast identifier, which may be received using a short-range broadcast communication. Broadcast identifiers received via cross-talk from power receive units located in an adjacent power transfer unit may not match the identifier received using close-range wireless communication.

When it is determined that the received identifier does not match the broadcast identifier or it is determined that the broadcast identifier was not received, method 700 may proceed to block 718 where it is determined whether there are additional predetermined charging locations to check. For example, broadcast identifiers received from power receive units located in a different predetermined charging location of the same power transfer unit may not match the identifier received using close-range wireless communication. The predetermined charging locations to be checked may include locations that have a power receive unit, such as when the power transfer unit is being powered up. When there are additional locations to check, method 700 may proceed to block 720 where the next predetermined charging location to be checked may be set. When the power transfer unit is powered up, each of the predetermined charging locations may be checked for the presence of a power receive unit and the next predetermined charging location to be checked may be set to increment the predetermined charging location. In some embodiments, when the power transfer unit may be responding to a short-range wireless broadcast communication, the next predetermined charging location to be checked may be set to the next predetermined charging location that did not have a power receive unit. For example, the current predetermined charging location may be the first predetermined charging location and the next predetermined charging location to be checked may be set to the third predetermined charging location when the second predetermined charging location had a power receive unit and the third predetermined charging location did not have a power receive unit.

When there are no additional predetermined charging locations to check or the received identifier matches the broadcast identifier, method 700 may proceed to block 722 where the magnetic resonance coil of the power transfer unit may be powered up. For example, magnetic resonance coil 426 of magnetic resonance power transmitting unit 402 as described for FIGS. 4A-C may be powered up. Close-range wireless communication may stop before the magnetic resonance coil is powered up to protect the close-range communication antenna, which may include powering down the close-range communication circuitry. For example, close-range communication antenna 328 as described for FIG. 3A may be protected by stopping close-range wireless communication including, for example, powering down close-range communication circuitry 322. When there no additional predetermined charging locations to check and no received identifier matches the broadcast identifier, close-range wireless communication and short-range wireless communication with the power receive unit associated with the broadcast identifier may stop.

Figure 4C:
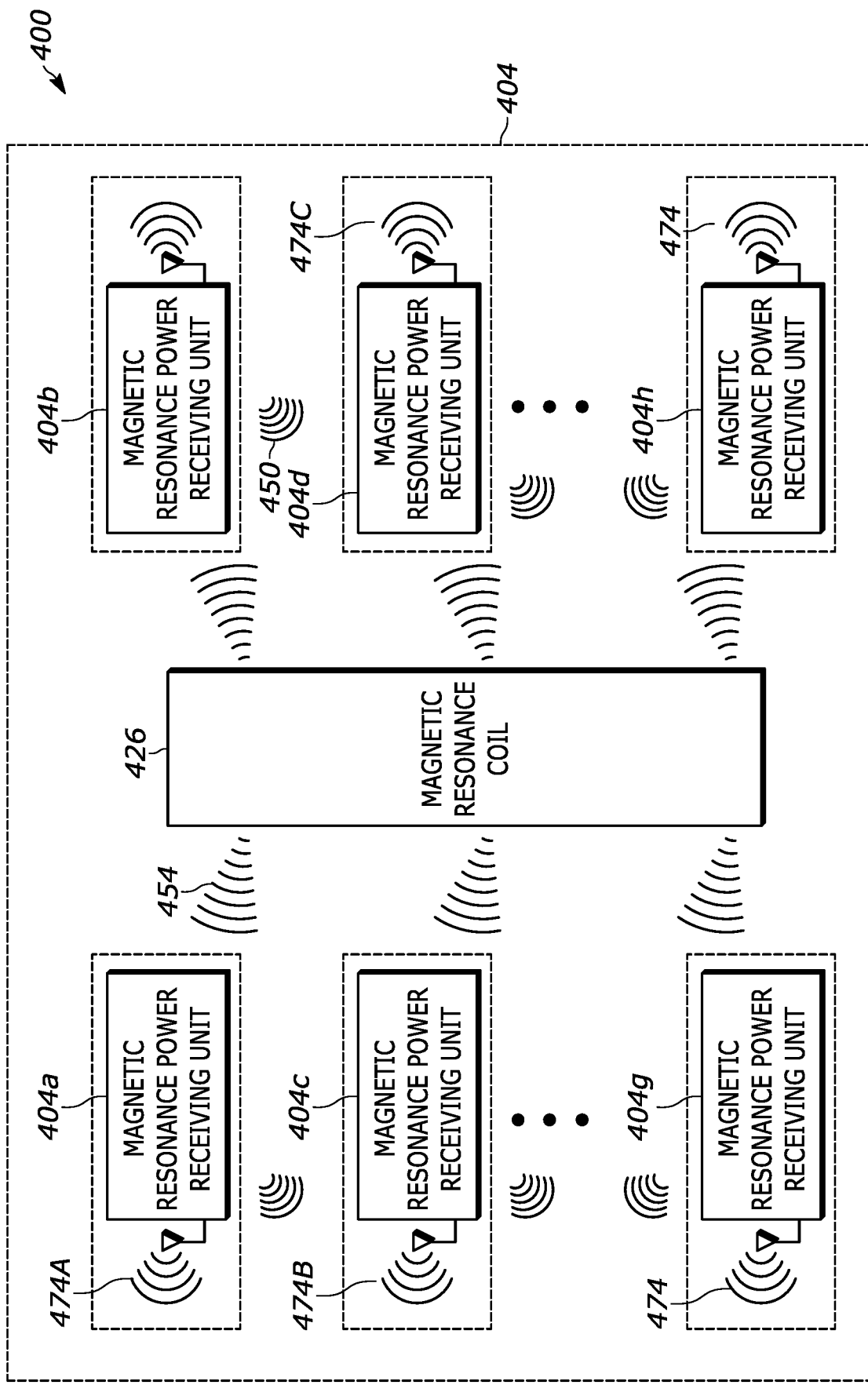
FIG. 4C is a top view of a block diagram illustrating a magnetic resonance power charging system, in accordance with some embodiments.

At block 726, information indicative of a status of a battery for each power receive unit may be pulled using short-range wireless communication and the stored identifier. Although short-range wireless communication is described, skilled artisans will appreciate that close-range wireless communication may be used when, for example, the magnetic resonance coil is powered down to provide low-power communication between the power transfer unit and power receive units. For example, each of the magnetic resonance power receiving units 404 as described for FIGS. 4A-C is coupled to a battery. Information indicative of a status of each battery may be pulled from each power receive unit using short-range wireless communication that is addressed using the identifier that was received previously from the power receive unit using close-range wireless communication. The battery may be internal to the power receive unit or externally coupled to the power receive unit. In various embodiments, the information may include one or more status indications about the battery including, but not limited to, charging usage data, an indication whether the battery was reconditioned, when battery was reconditioned, an indication whether the battery should be reconditioned, battery name, battery type, serial number of battery or portable device, state of charge for one or more batteries, amount of charge for one or more batteries, rated capacity for one or more power sources, initial capacity for one or more power sources, number of charge cycles for one or more power sources, number of reconditioning cycles for one or more power sources, and age of one or more batteries. Although a battery is described, skilled artisans will appreciate that other types of power sources may be used and that any suitable number of power sources may be used for a portable device.

At block 728, an indication of the battery status for each of the predetermined charging locations with a stored identifier may be updated for display. For example, the status may be displayed as described for block 612 of FIG. 6. The indication of the battery status may include any suitable information, including but not limited to, an amount of charge for the battery and time to fully charge the battery. The indication of status may be displayed for each battery or grouping of batteries. For example, when the power receive unit contains a plurality of batteries the status may correspond to the plurality of batteries.

Figure 8:
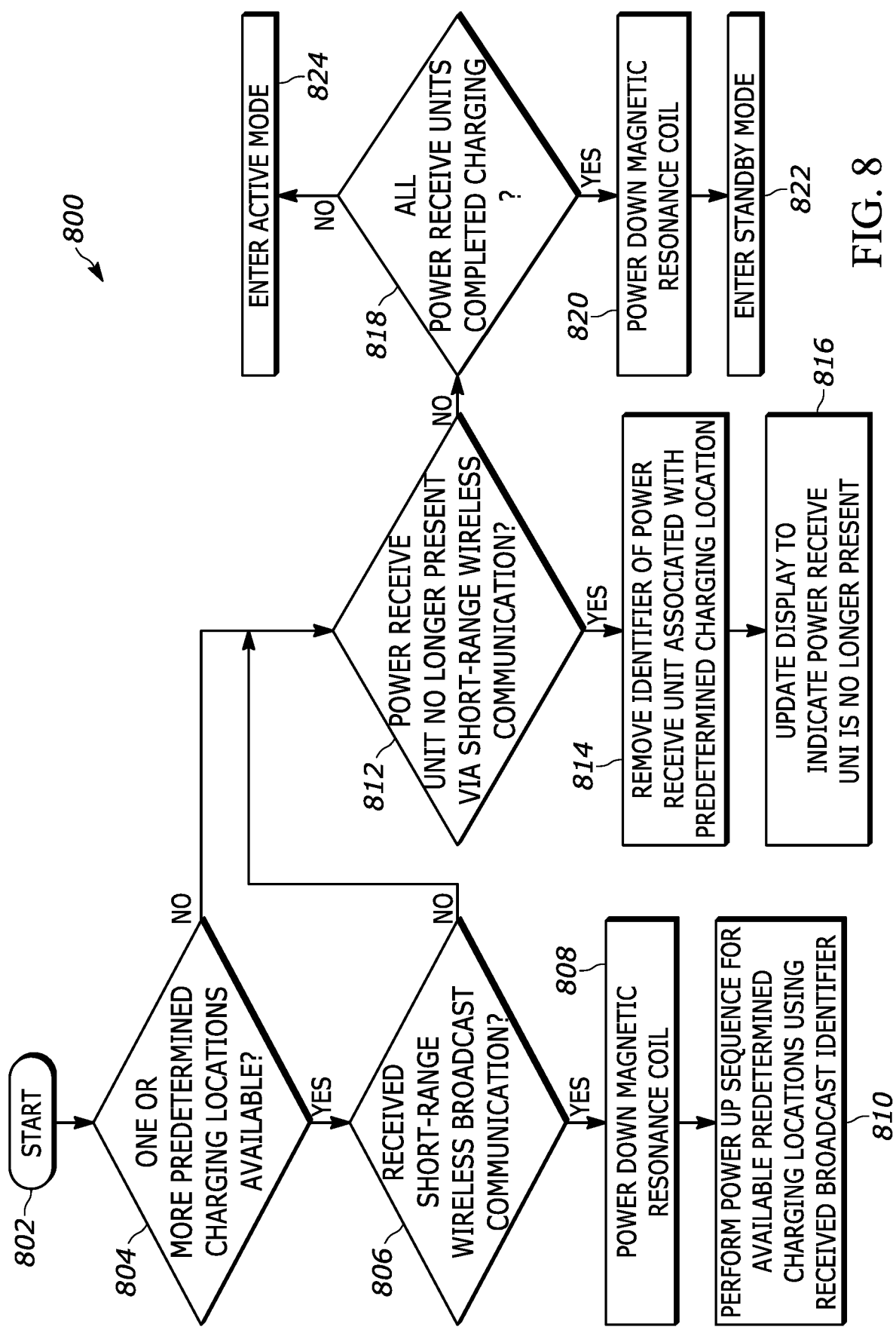
FIG. 8 is a flow diagram illustrating a method for an active mode of magnetic resonance power transfer, in accordance with some embodiments.

Referring now to FIG. 8, there is provided a flow diagram illustrating a method for an active mode of magnetic resonance power transfer. While a particular order of operations is indicated in FIG. 8 for illustrative purposes, the timing and ordering of such operations may vary where appropriate without negating the purpose and advantages of the examples set forth in detail throughout the remainder of this disclosure. In some embodiments, one or more portions of method 800 may be executed at some predetermined periodic time period thereafter, in response to a timeout, broadcast communication, communication that a power receive unit is no longer present, or a power-up event. For example, it may be determined whether one or more predetermined charging locations are available after it is determined whether a short-range wireless broadcast communication was received.

In this example embodiment, method 800 begins with block 802 in FIG. 8 and continue to block 804 where it may be determined whether one or more predetermined charging locations are available. A predetermined charging location may be available when there is no identifier stored in association with the predetermined charging location or when an indication is stored representing that the predetermined charging location is empty. For example, magnetic resonance transmitting controller 312 as described for FIG. 3A may store the identifier in any suitable structure, such as a list, table, or map. When a predetermined charging location is available, method 800 may proceed to block 806 where it may be determined whether a short-range wireless broadcast communication was received. In various embodiments, the short-range wireless broadcast communication may be provided in accordance with one or more protocols, such as a Bluetooth protocol. The short-range broadcast communication may be sent from a power receive unit to a plurality of other devices, such as a plurality of power transfer units. The power transfer unit may need to verify whether the power receive unit that sent the short-range broadcast communication is located at one of the predetermined charging locations of the power receive unit before responding to the short-range broadcast communication or attempting to transfer energy to the power receive unit.

When a short-range broadcast communication is received by a power transfer unit, method 800 may proceed to block 808 where the magnetic resonance coil of the power transfer unit may be powered down. For example, magnetic resonance coil 426 of magnetic resonance power transmitting unit 402 may be powered down as described for FIGS. 4A-C. In some embodiments, the magnetic resonance coil may be powered down before close-range wireless communications begin and powered up after close-range wireless communications end to reduce the likelihood of damage to antennas and circuitry for close-range wireless communications that may operate at a harmonic frequency of the magnetic resonance coil. At block 810, a power-up sequence may be performed for the predetermined charging locations that are available using the received broadcast identifier. For example, the power-up sequence may follow method 700 as described for FIG. 7.

When one or more predetermined charging locations are not available or when a short-range wireless broadcast communication is not received, method 800 may proceed to block 812 where it may be determined whether one or more of the power receive units are no longer present via short-range wireless communication. The determination may include evaluating whether a response is received via a short-range wireless communication after a communication using a stored identifier, such as whether the power receive unit responds using short-range wireless communication before a timeout. When one or more of the power receive units are no longer present, method 800 may proceed to block 814 where the identifier of the power receive unit may be removed from an association with the predetermined charging location. For example, magnetic resonance transmitting controller 312 as described for FIG. 3A may remove the identifier from any suitable structure, such as a list, table, or map. At block 816, a display may be updated to indicate that a power receive unit is no longer present. For example, the battery status of the power receive unit may be removed from the display. As another example, an LED may change color to indicate that a power receive unit has been removed. In various embodiments, the display may be internal display 310 as described for FIG. 3A or external display 439 as described for FIGS. 4A and 4B.

When it is determined that the power receive units are present, method 800 may proceed to block 818 where it may be determined whether all power receive units located at the predetermined charging locations and in proximity to the power transfer unit have completed charging. The determination may be based on whether one or more internal or external power sources that are electrically coupled to a power receive unit have completed charging. For example, internal battery 505*a* and external battery 505*b* coupled to magnetic resonance power receive unit 504 as described for FIG. 5 may complete charging when each battery is fully charged. When at least one battery for one power receive unit has not completed charging, method 800 may proceed to block 824 where active mode is entered or maintained. In various embodiments, active mode may maintain the magnetic resonance coil in a powered-up state to continue power transfer to one or more power receive units via the magnetic resonance coil. Active mode may include receiving one or more short-range or close-range wireless communications, such as described for block 806, block 812, or block 818.

When all batteries of all power receive units has completed charging, method 800 may proceed to block 820 where the magnetic resonance coil of the power transfer unit may be powered down. Powering down the magnetic resonance coil may save power and improve the energy efficiency of the power transfer unit. At block 822, the power transfer unit may enter standby mode. In various embodiments, standby mode may place one or more controllers and associated circuitry in a low power state. For example, short-range communication controller 318, short-range communication transmitter/receiver 324, display controller 313, display 310, and magnetic resonance power transmitter circuit 310 as described for FIG. 3A may be placed in a low power state, which may save power and improve the energy efficiency of magnetic resonance power transmitting unit 302.

Figure 9:
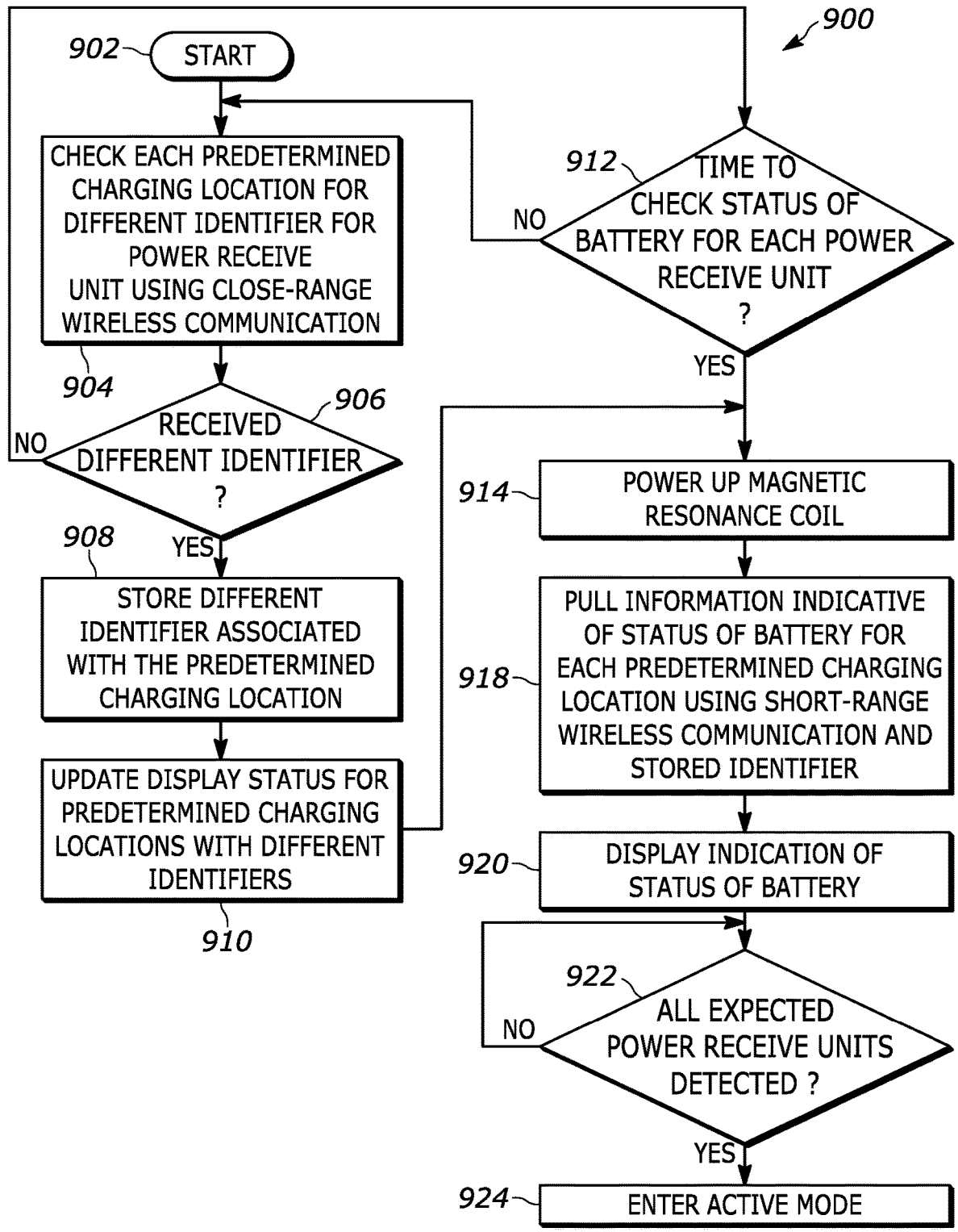
FIG. 9 is a flow diagram illustrating a method for standby mode of magnetic resonance power transfer, in accordance with some embodiments.

Referring now to FIG. 9, there is provided a flow diagram illustrating a method for standby mode of magnetic resonance power transfer. While a particular order of operations is indicated in FIG. 9 for illustrative purposes, the timing and ordering of such operations may vary where appropriate without negating the purpose and advantages of the examples set forth in detail throughout the remainder of this disclosure. In some embodiments, one or more portions of method 900 may be executed at some predetermined periodic time period thereafter, in response to a timeout, a broadcast communication, a power-up event, or when it is time to check for the presence of power receive units. For example, checking the status of the presence for each of power receive units may be performed after checking the status of the battery for each of the power receive units.

In this example embodiment, method 900 begins with block 902 in FIG. 9 and continue to block 904 where each of the predetermined charging locations may be checked for different identifiers for the power receive unit using close-range wireless communication. The check for different identifiers may be initiated based on any suitable periodic timing mechanism, including but not limited to an interrupt-based timer that is reset when the status of each of the power receive units is checked for its presence and when the magnetic resonance coil of the power transfer unit is powered down. For example, the power transfer unit may poll each of the predetermined charging locations to request an identifier from the power receive unit located at the location and in proximity to the magnetic resonance coil of the power transfer unit. The power receive unit may respond with an identifier using close-range wireless communication. In various embodiments, the close-range wireless communication may be provided in accordance with one or more protocols, such as an NFC protocol. At block 906, it may be determined whether a different identifier was received. The determination may be based on a comparison for each predetermined charging location between the received identifier and a stored identifier. When at least one received identifier is different, method 900 may proceed to block 908 where the different identifier may be stored in association with the predetermined charging location. For example, the power transfer unit may store an identifier received from a power receive unit and an indication of which predetermined charging location is associated with the power receive unit. At block 910, a display may be updated with the status of the power receive units at the predetermined charging locations with different identifiers, which may correspond to different power receive units being present. The display may be updated to indicate the status of a battery, as described for block 612 in FIG. 6 or block 728 in FIG. 7.

When it is determined that a different identifier was not received, method 900 may proceed to block 912 where it may be determined whether it is time to check the status of a battery for each of the power receive units associated with a predetermined charging location and in proximity to the power transfer unit. The determination may be based on any suitable periodic timing mechanism, including but not limited to an interrupt-based timer that is reset when the status of the battery of each of the power receive units is checked or when the magnetic resonance coil of the power transfer unit is powered down. When it is determined that it is time to check the battery status or after the display is updated at block 910, method 900 may proceed to block 914 where the magnetic resonance coil of the power transfer unit is powered up. For example, magnetic resonance coil 326 of magnetic resonance power transmitting unit 302 may be powered up as described for FIG. 3A. At block 918, information indicative of the status of a battery for each predetermined location with a stored identifier may be pulled using short-range wireless communication. Checking information by pulling data may be similar to pulling information for block 726 as described by FIG. 7. At block 920, an indication of the status of the battery may updated on the display. The display and information shown on the display may be similar to the display for block 728 as described in FIG. 7.

At block 922, it may be determined whether all of the expected power receive units are detected. In various embodiments, the power receive units that may be expected include the power receive units with a stored identifier corresponding to a predetermined charging location. When all expected power receive units are detected, method 900 may proceed to block 924 where active mode is entered. In various embodiments, active mode may include transferring energy from the power transfer unit to one or more power receive units via the magnetic resonance coil. Active mode may include receiving one or more short-range or close-range wireless communications, such as described for blocks 806, 812, 818, or 824 in FIG. 8. For example, when a different identifier is received, block 924 may include performing a power up sequence as described for block 810 in FIG. 8 or one or blocks in FIG. 7 including, but not limited to, block 714.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

Accordingly, there has been provided a method, and apparatus for active device recognition and elimination of cross-talk between multiple magnetic resonance chargers. The magnetic resonance power transfer approach provided by the various embodiments allows for adjacent chargers to charge multiple portable devices wirelessly without crosstalk. The functionality has been provided without dedicating a charger for each portable device, without adding multiple coils to the charger, or without the use of chargers do not have predetermined charging locations, such as a charging pad. Moreover, the magnetic resonance power transfer approach provided by the various embodiments allows for improvements in energy efficiency when the energy source of the portable device, such as a battery, is fully charged. The functionality has been provided without disabling energy transfer without end.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the system, method, or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (ICs) with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of any single disclosed embodiment. Thus the following claims are hereby incorporated into the Detailed Description, with each claim standing on its own as a separately claimed subject matter.

I claim:

1. A method for preventing cross-talk in one-to-many magnetic resonance power transfer, comprising:
powering down a magnetic resonance coil of a power transfer unit;
receiving an identifier from a first power receive unit located in a first predetermined charging location using close-range wireless communication, the first predetermined charging location among a plurality of predetermined charging locations for a plurality of power receive units, the plurality of predetermined charging locations in proximity to the power transfer unit;
powering up the magnetic resonance coil of the power transfer unit upon receipt of the identifier of the first power receive unit;
receiving information from the first power receive unit using short-range wireless communication, the short-range wireless communication addressing the first power receive unit with the identifier and the information indicative of a status of a battery electrically coupled to the first power receive unit;
transferring energy from the power transfer unit to the first power receive unit using the magnetic resonance coil; and
displaying an indication of the status of the battery to a display communicatively coupled to the power transfer unit.

2. The method of claim 1, further comprising:
receiving a broadcast communication from a second power receive unit using the short-range wireless communication, the second power receive unit in proximity to the power transfer unit;
powering down the magnetic resonance coil of the power transfer unit upon receipt of the broadcast communication;
checking a second predetermined charging location to receive a second identifier using the close-range wireless communication;
determining whether the second power receive unit is located at the second predetermined charging location based on whether the second identifier was received from the second power receive unit; and
checking a third predetermined charging location to receive a third identifier using close-range wireless communication based on a determination that the second power receive unit is not located at the second predetermined charging location.

3. The method of claim 1, further comprising:
powering down the magnetic resonance coil of the power transfer unit based on a determination that for each of the plurality of power receive units, a battery associated with the power receive unit in proximity to the power transfer unit and located at one of the plurality of predetermined charging locations is fully charged;
for each of the power receive units in proximity to the power transfer unit and located at one of the plurality of predetermined charging locations:
checking an amount of charge of the battery using the short-range wireless communication or the close-range wireless communication; and
updating the display with an indication of the amount of charge of the battery.

4. The method of claim 1, further comprising:
storing the identifier and an indication of the first predetermined charging location upon receipt of the identifier of the first power receive unit.

5. The method of claim 1, wherein the status comprises one or more of the following:
a name of the battery;
a serial number of the battery;
a battery type of the battery;
a capacity of the battery;
an amount of charge for the battery;
an age of the battery;
an indication whether the battery was reconditioned; and
usage data for the battery.

6. The method of claim 1, wherein the close-range wireless communication uses a near-field communication protocol and the short-range wireless communication uses a Bluetooth communication protocol.

7. The method of claim 1, wherein a plurality of LEDs of the display correspond to the plurality of predetermined charging locations.

8. The method of claim 1, wherein the first power receive unit contains an antenna for the close-range wireless communication and a magnetic resonance coil for receiving the transferred energy, the antenna and magnetic resonance coil located on the same plane.

9. The method of claim 3, wherein powering down the magnetic resonance coil of the power transfer unit based on the determination that the battery in each of the plurality of power receive units in proximity to the power transfer unit and located at one of the plurality of predetermined charging locations is fully charged further comprises placing the power transfer unit in a standby mode.

10. The method of claim 9, further comprising:
periodically checking, using the close-range wireless communication, for changes in identifiers of the plurality of power receive units located in proximity to the power transfer unit and located at one of the plurality of predetermined charging locations, upon the magnetic resonance coil of the power transfer unit being powered down;
for each of the power receive units in proximity to the power transfer unit and located at one of the plurality of predetermined charging locations, periodically checking the amount of charge of the battery of the power receive unit using the short-range wireless communication; and
maintaining the magnetic resonance coil of the power transfer unit powered up based on a determination that for one or more power receive units in proximity to the power transfer unit and located at one of the plurality of predetermined charging locations, the battery associated with the power receive units requires additional charge.

11. A magnetic resonance power transmitting unit for preventing cross-talk in one-to-many magnetic resonance power transfer, comprising:
a magnetic resonance coil;
a magnetic resonance transmitting controller coupled to:
a magnetic resonance power transmitter circuit, the magnetic resonance power transmitter circuit configured to power down the magnetic resonance coil;
a close-range communication controller, the close-range communication controller configured to receive an identifier from a first magnetic resonance power receiving unit located in a first predetermined charging location using close-range wireless communication, the first predetermined charging location among a plurality of predetermined charging locations for a plurality of magnetic resonance power receiving units, the plurality of predetermined charging locations in proximity to the magnetic resonance coil;
a short-range communication controller; and
a display, wherein:
the magnetic resonance power transmitter circuit is configured to power up the magnetic resonance coil upon receipt of the identifier of the first magnetic resonance power receiving unit;
the short-range communication controller is configured to receive information from the first magnetic resonance power receiving unit using short-range wireless communication, the short-range wireless communication addressing the first magnetic resonance power receiving unit with the identifier of the first magnetic resonance power receiving unit, the information indicative of a status of a battery electrically coupled to the first magnetic resonance power receiving unit;
the magnetic resonance power transmitter circuit is configured to control a transfer of energy to the first magnetic resonance power receiving unit using the magnetic resonance coil; and
the magnetic resonance power transmitter circuit is configured to provide an indication of the status of the battery to the display.

12. The magnetic resonance power transmitting unit of claim 11, wherein:
the short-range communication controller is configured to receive a broadcast communication from a second magnetic resonance power receiving unit using the short-range wireless communication, the second magnetic resonance power receiving unit in proximity to the short-range communication controller;
the magnetic resonance power transmitter circuit is configured to power down the magnetic resonance coil upon receipt of the broadcast communication;
the close-range communication controller is configured to check a second predetermined charging location to receive a second identifier was received from the second magnetic resonance power receiving unit;
the magnetic resonance transmitting controller is configured to:
determine whether the second magnetic resonance power receiving unit is located at second predetermined charging location based on whether the second identifier was received from the second magnetic resonance power receiving unit; and
set the next predetermined charging location to be checked based on a determination that the second magnetic resonance power receiving unit is not located at the second predetermined charging location; and
the magnetic resonance power transmitter circuit is configured to power down the magnetic resonance coil upon receipt of the broadcast communication.

13. The magnetic resonance power transmitting unit of claim 11, wherein:
the magnetic resonance power transmitter circuit is configured to power down the magnetic resonance coil based on a determination that for each of the plurality of magnetic resonance power receiving units, a battery associated with the magnetic resonance power receiving unit in proximity to the magnetic resonance coil and located at one of the plurality of predetermined charging locations is fully charged;
for each of the magnetic resonance power receiving units in proximity to the magnetic resonance coil and located at one of the plurality of predetermined charging locations:
the short-range communication controller is configured to check an amount of charge of the battery using short-range wireless communication; and
the magnetic resonance transmitting controller is configured to update the display with an indication of the amount of charge of the battery.

14. The magnetic resonance power transmitting unit of claim 11, wherein the magnetic resonance transmitting controller is configured to store the identifier of the first magnetic resonance power receiving unit and an indication of the first predetermined charging location upon receipt of the identifier of the first magnetic resonance power receiving unit.

15. The magnetic resonance power transmitting unit of claim 11, wherein the status comprises one or more of the following:
a name of the battery;
a serial number of the battery;
a battery type of the battery;
a capacity of the battery;
an amount of charge of the battery;
an age of the battery;
an indication whether the battery was reconditioned;
usage data for the battery.

16. The magnetic resonance power transmitting unit of claim 11, wherein the close-range wireless communication uses a near-field communication protocol and the short-range wireless communication uses a Bluetooth communication protocol.

17. The magnetic resonance power transmitting unit of claim 11, wherein the display includes a plurality of LEDs, the plurality of LED corresponding to the plurality of predetermined charging locations.

18. The magnetic resonance power transmitting unit of claim 11, further comprising:
   a close-range communication antenna for close-range wireless communication, wherein the close-range communication antenna comprises a coil.

19. The magnetic resonance power transmitting unit of claim 13, wherein powering down the magnetic resonance coil is based on the determination that the battery in each of the plurality of magnetic resonance power receiving units in proximity to the magnetic resonance coil and located at one of the plurality of predetermined charging location is fully charged further comprises the magnetic resonance transmitting controller configured to place the magnetic resonance power transmitting unit in a standby mode.

20. The magnetic resonance power transmitting unit of claim 18, wherein:

the magnetic resonance transmitting controller is configured to check for changes periodically in identifiers of the magnetic resonance power receiving units located in proximity to the magnetic resonance coil and location at one of the plurality of predetermined charging locations, upon the magnetic resonance power transmitter circuit powering down the magnetic resonance coil;

for each of the magnetic resonance power receiving units in proximity to the magnetic resonance coil and located at one of the plurality of predetermined charging locations, the short-range communication controller configured to check the amount of charge of the battery of the magnetic resonance power receiving unit using short-range wireless communication; and the magnetic resonance power transmitter circuit configured to maintain the magnetic resonance coil powered up based on a determination that for one or more magnetic resonance power receiving units in proximity to the magnetic resonance coil and located at one of the plurality of predetermined charging locations, the battery associated with the magnetic resonance power receiving unit requires additional charge.

* * * * *